(12) United States Patent
Nagatomo et al.

(10) Patent No.: US 8,727,890 B2
(45) Date of Patent: May 20, 2014

(54) GAME SYSTEM AND PLAYER MATCHING METHOD

(75) Inventors: Yasuyuki Nagatomo, Minato-ku (JP); Yoshihiko Aramaki, Minato-ku (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 29 days.

(21) Appl. No.: 13/700,967

(22) PCT Filed: Jun. 1, 2011

(86) PCT No.: PCT/JP2011/062614
§ 371 (c)(1),
(2), (4) Date: Nov. 29, 2012

(87) PCT Pub. No.: WO2011/152462
PCT Pub. Date: Dec. 8, 2011

(65) Prior Publication Data
US 2013/0165236 A1 Jun. 27, 2013

(30) Foreign Application Priority Data
Jun. 4, 2010 (JP) ................................. 2010-129312

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .................. 463/42; 463/20; 463/25; 463/39; 463/40; 276/292

(58) Field of Classification Search
USPC .................... 463/20, 25, 39, 40, 42
See application file for complete search history.

(56) References Cited

U.S. PATENT DOCUMENTS

2003/0104868 A1 6/2003 Okita et al.
2008/0102958 A1 5/2008 Kitamura et al.

FOREIGN PATENT DOCUMENTS

| JP | 2003-225469 A | 8/2003 |
| JP | 2006-254979 A | 9/2006 |
| JP | 2008-113766 A | 5/2008 |
| JP | 2009-273492 A | 11/2009 |

OTHER PUBLICATIONS

Japanese Office Action with English Translation (Dated Oct. 25, 2011).
International Search Report (Date of Mailing Jul. 5, 2011).
Tsushin Taisen Majan Toryumon, Famitsu Xbox 360, Jan. 1, 2006, vol. 5, No. 1, (Whole No. 45), pp. 018 to 019.

*Primary Examiner* — Adetokunbo O Torimiro
(74) *Attorney, Agent, or Firm* — Howard & Howard Attorneys PLLC

(57) ABSTRACT

In a gaming system, preferential matching is achieved while suppressing increase of load on a server device. In order to determine whether a matching between specific players should be prioritized over other matchings a discrimination is made between whether or not a player satisfies a predetermined priority condition associated with information at a respective gaming console, and if the priority condition is satisfied, priority information indicating that the priority condition has been satisfied is added to a request for matching and transmitted to a server, whereupon at the server, if the request for matching to which the priority information has been added is received, the player of the gaming console that has transmitted the request for matching is prioritized in being matched between the specific players over players who do not satisfy the priority condition.

7 Claims, 7 Drawing Sheets

GAME SYSTEM AND PLAYER MATCHING METHOD

CROSS REFERENCE TO RELATED APPLICATION

This application is a national stage application of PCT/JP2011/062614, filed Jun. 1, 2011, which claims priority to Japanese Patent Application No. 2010-129312, filed Jun. 4, 2010, the disclosures of which are hereby incorporated by reference in their entirety.

TECHNICAL FIELD

The present invention relates to a game system and the like, which are capable of playing a game using communication between terminal devices of matched players.

BACKGROUND ART

A game system is well known, in which a server device matches players with reference to player information, and terminal devices of the matched players play a game while using communication. For example, there has been proposed a game system in which a matching request containing identification information of players is transmitted from terminal devices to a server device (sometimes referred to as a lobby server), and the server device discriminates information necessary for determining a matching based on the identification information contained in the matching request, and matches players satisfying a matching condition such as a condition that a level difference is within a predetermined range (see Patent Literature 1). Alternatively, there has been proposed a game system which stores a think time of past matching battles of players in a server device and matches players whose think time is close (see Patent Literature 2).

Patent Literature 1: Japanese Patent Application Laid-Open (JP-A) No. 2003-225469 and Patent Literature 2: JP-A No. 2009-273492.

SUMMARY OF INVENTION

Technical Problem

In a conventional game system, information necessary to be considered in a matching is held in a server device side in association with identification information of players, and the server device performs all processes related to the availability of the matching, such as the extraction of information necessary for determining the availability of the matching, the determination as to whether matching condition is satisfied, and the like. The terminal device just transmits the identification information of the player. Therefore, in the matching process, in the case of setting a certain preferential treatment, the server device needs to perform information extraction or the like for determining matching priority, and thus the load of the server device increases. In a relatively large-scale game system including a plurality of terminal devices, the frequency of the matching process is high and the load of the server device is considerably increased.

Therefore, an object of the present invention is to provide a game system and the like, which are capable of realizing a preferential matching while suppressing an increase in a load of a server device.

Solution to Problem

A game system of the invention is a game system in which a server device and a plurality of terminal devices are connected to one another through a network, a matching request containing player identification information for identifying the players is transmitted from each of the plurality of terminal devices to the server device, the server device receiving the matching request matches the players with reference to the player identification information, and a game is executed using communication between the terminal devices of the matched players, and wherein each of the plurality of terminal devices comprises: a priority determining device that determines whether or not the player satisfies predetermined priority condition set in association with information held by the terminal device, in order to determine whether to prioritize a matching between specific players over other matching; and a priority information adding device that adds priority information, which indicates that the corresponding priority condition is satisfied, to the matching request, when it is determined in the priority determining device that the priority condition is satisfied, and the server device comprises a preferential matching device that, when receiving the matching request to which the priority information is added, matches players of the terminal devices transmitting the matching request among the specific players in preference to players who do not satisfy the priority condition.

Also, a player matching method of a game system of the invention is a player matching method that is applied to a game system in which a server device and a plurality of terminal devices are connected to one another through a network, a matching request containing player identification information for identifying the players is transmitted from each of the plurality of terminal devices to the server device, the server device receiving the matching request matches the players with reference to the player identification information, and the matching result is transmitted from the server device to the terminal devices, and wherein the player matching method comprises the steps: a priority determining step that determines, by the terminal devices, whether or not the player satisfies predetermined priority condition set in association with information held by the terminal device, in order to determine whether to prioritize a matching between specific players over other matching; a step that adds, by the terminal devices, priority information, which indicates that the corresponding priority condition is satisfied, to the matching request, when it is determined in the priority determining step that the priority condition is satisfied; and a step that, when the server device receives the matching request to which the priority information is added, matches players of the terminal devices transmitting the matching request among the specific players in preference to players who do not satisfy the priority condition.

According to the invention, whether or not the player satisfies the priority condition is determined in the terminal device side, based on the information held by the terminal devices, and the priority information indicating that the priority condition is satisfied is added to the matching request. In the server device, when receiving the matching request to which the priority information is added, a preferential matching is performed by the preferential matching device. Therefore, compared with the case where whether or not the priority condition is satisfied is determined in the server device, the processing to be performed by the server device in order to realize the preferential matching is reduced. Therefore, the preferential matching can be realized while suppressing an increase in the load of the server device.

In an embodiment of the invention, the preferential matching device may preferentially match the player satisfying the priority condition with the player satisfying a predetermined specific condition. Therefore, the player satisfying the priority condition can be preferentially matched with the player satisfying the specific condition.

In the above-described embodiment, the terminal device comprises: a specific condition determining device that determines whether or not the player satisfies the specific condition, based on the information held by the corresponding terminal device; and a specific information adding device that adds specific determination information for determining whether or not the specific condition is satisfied, to the matching request, and wherein when receiving the matching request to which the specific information is added, the preferential matching device may preferentially match the player of the terminal device transmitting the corresponding matching request with the player of the terminal device transmitting the matching request to which the priority information is added. Therefore, since the terminal device also determines whether or not the specific condition is satisfied, the player satisfying the priority condition can be preferentially matched with the player satisfying the specific condition, while suppressing the increase in the load of the server device.

Furthermore, the specific condition is set such that the specific condition is satisfied by limiting a part of players satisfying the priority condition, and the preferential matching device may preferentially match a player, who satisfies the specific condition, with a player, who satisfies the priority condition but does not satisfy the specific condition. Therefore, between the players satisfying the priority condition, the player who satisfies the specific condition and the player who does not satisfy the specific condition can be preferentially matched with each other.

In an embodiment of the present invention, the terminal device can select one payment method from a plurality of payment methods with respect to at least a part of a game play fee; payment information determining whether a specific payment method is selected from the plurality of payment methods is held in the terminal device; the priority determining device determines whether or not the specific payment method is selected based on the payment information, and may determine that at least a part of the priority condition is satisfied, when the specific payment method is selected. Therefore, since the preferential matching is performed when the specific payment method is selected, a motivation for the selection of the specific payment method can be given to the player.

In an embodiment of the present invention, the terminal device can allow the player to select a game play in a predetermined game mode; mode selection information determining whether the predetermined game mode is selected is held in the terminal device; the priority determining device determines whether or not the predetermined game mode is selected, based on the mode selection information, and may determine that at least a part of the priority condition is satisfied, when the predetermined game mode is selected. Therefore, since the preferential matching is performed when the predetermined game mode is selected, a motivation for the selection of the game mode can be given to the player.

Advantageous Effects of Invention

As described above, according to the present invention, a terminal device determines whether or not a player satisfies a priority condition based on information held by a terminal device. As a result of determination, in other words, priority information indicating that the priority condition is satisfied is added to a matching request. And, when receiving the matching request to which the priority information is added, the server device performs a preferential matching. There-fore, the preferential matching can be realized while suppressing an increase in the load of the server device.

DESCRIPTION OF EMBODIMENTS

Figure 1:
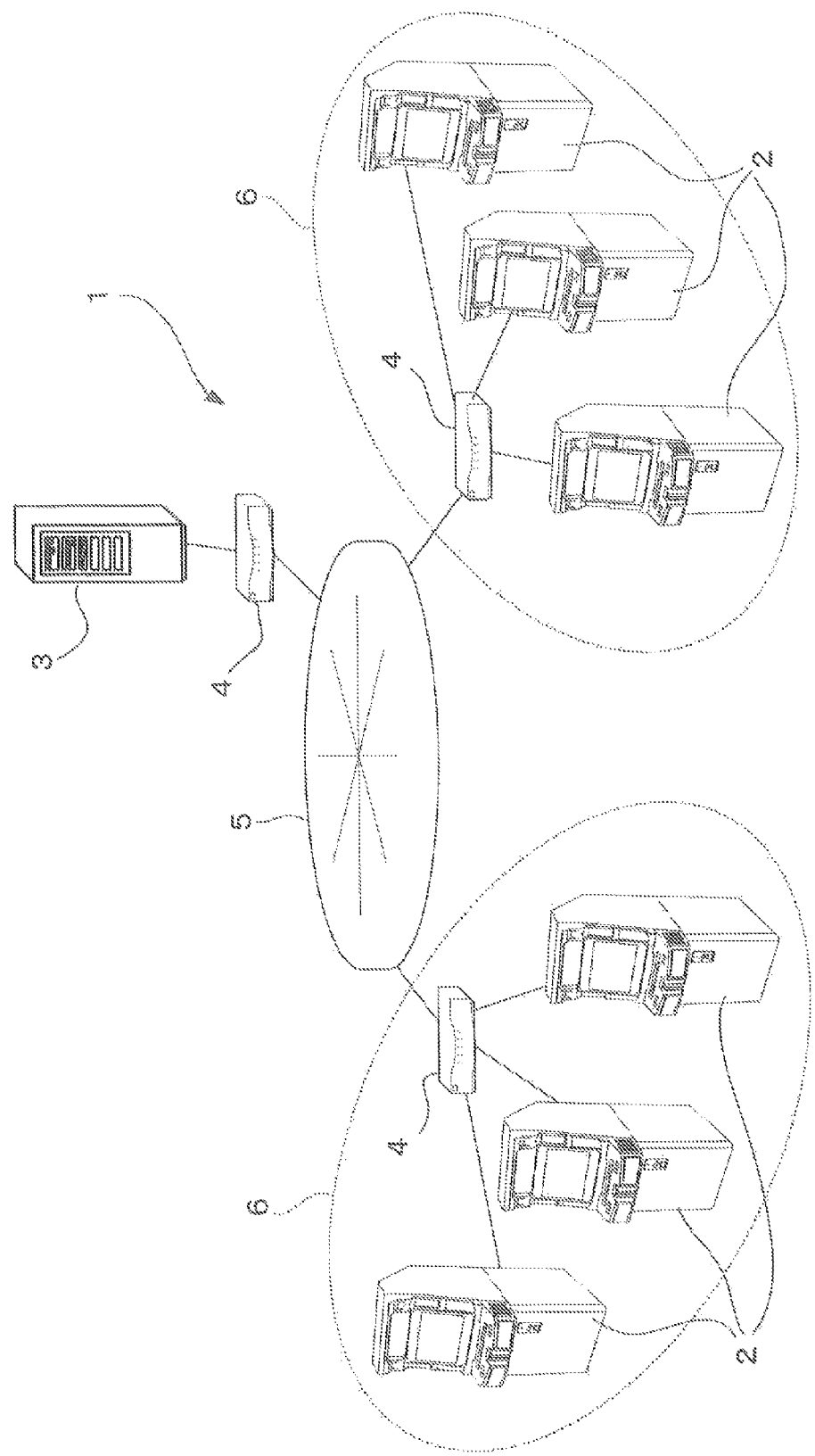
FIG. 1 is a diagram illustrating a schematic configuration of a game system according to an embodiment of the invention.

A game system according to an embodiment of the invention is illustrated in FIG. 1. In the game system 1, a plurality of game machines 2 and a center server 3 are connected to a network 5 through routers 4. The game machines 2 correspond to a terminal device in the invention, and the center server 3 corresponds to the server device in the invention. The center server 3 is not limited to an example that is configured by a single physical device, and the single logical center server 3 may be configured by a server group as a plurality of physical devices. Furthermore, the single game machine 2 may also be used as the center server 3. The network 5 realizes network communication by using a TCP/IP protocol. Typically, the Internet is used as the network 5. Each of the game machines 2 is configured as a game machine for commercial purpose or business purpose of collecting a play fee for a game. The game machines 2 are installed in commercial facilities, such as stores 6, with an appropriate number. The routers 4 are installed corresponding to the respective stores 6 and the center server 3, and the game machines 2 of the same store are connected to the network 5 through the common routers 4. A local server may be installed between the game machine 2 and the routers 4 of the stores 6, and the game machine 2 may be connected to be communicable with the center server 3 through the local server.

The center server 3 is installed by an operator of the game system 1 and provides a variety of services to the game machine 2 or a player (user) of the game machine 2 through the network 5. As one example, the center server 3 provides a service that updates a game program or data through the game machine 2, a service that authenticates a player of the game machine 2 and stores, in the center server 3, personal information such as a name of the player, and player information generated in association with play content of the player such as a play history, a play score, and a level (index indicating the strength of the game or the high/low level of the skill) of the player, and a player matching service when players are matched against each other or progress the game in cooperation with each other through the network 5.

The game machines 2 and the center server 3 are assigned with unique IP addresses for identifying the game machine 2 and the center server 3 on the network 5. In the communication between the game machines 2 or between the game machines 2 and the center server 3, communication opponents are specified using the IP addresses. In the case where the network 5 is a network having openness, such as the Internet, unique fixed addresses are set to the respective routers 4 on the network 5. In the game machine 2, private addresses for uniquely identifying the game machines 2 on the network 5 by combination with the fixed addresses are set as IP addresses. In this case, a virtual private network (VPN) is established between the game machines 2 and the center server 3 or between the game machines 2, and the respective game machines 2 are uniquely specified using the private addresses on the VPN.

Figure 2:
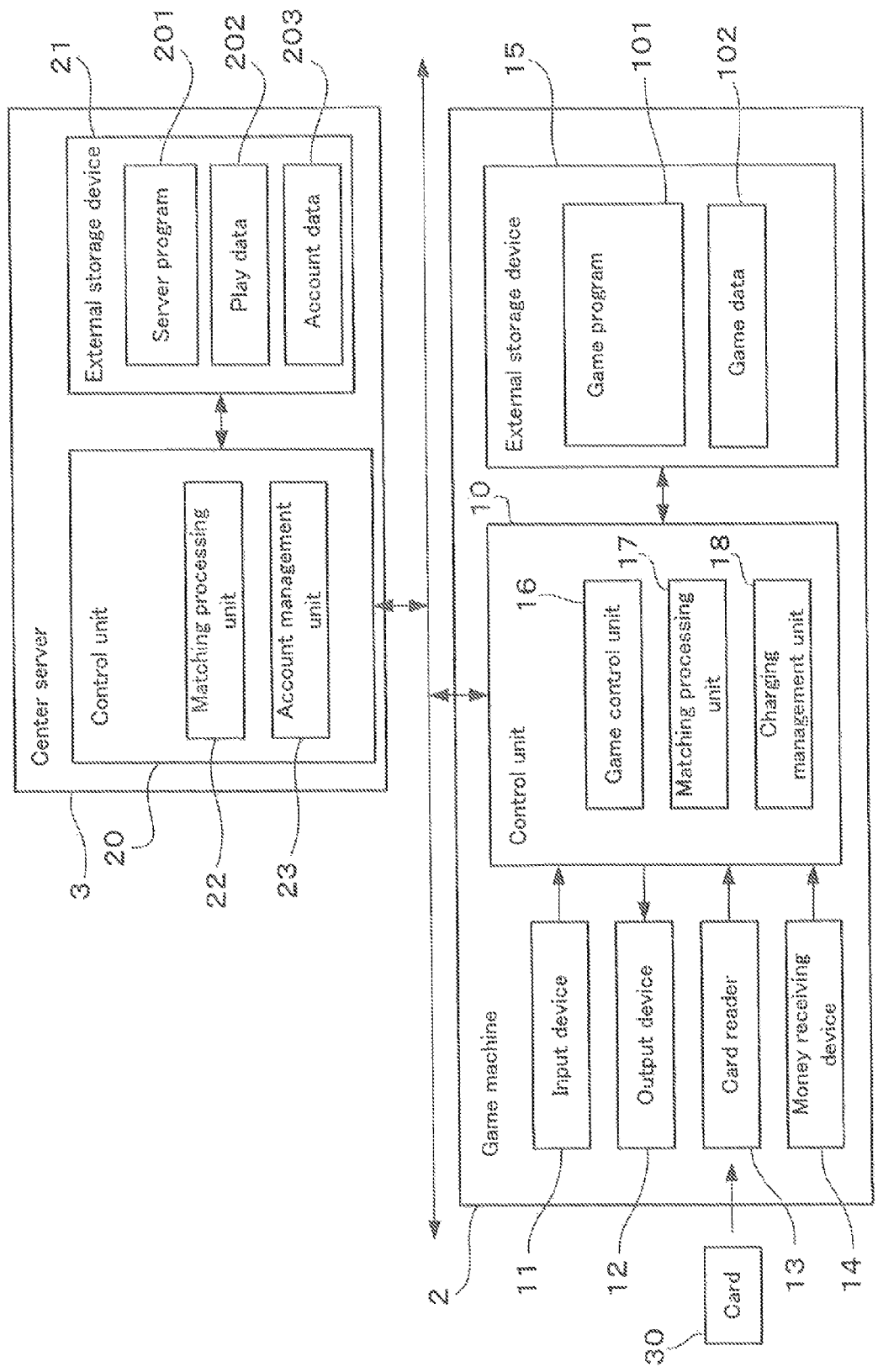
FIG. 2 is a functional block diagram of a game machine and a center server of FIG. 1.

The configuration of the game machines 2 and the center server 3 will be further described with reference to FIG. 2. The game machine 2 includes a control unit 10. The control unit 10 is a computer unit that includes a microprocessor and an internal storage device (not illustrated) such as a ROM storing a program of an operating system or the like necessary to be executed in the microprocessor, and a RAM providing a working area to the microprocessor. An input device 11, an output device 12, a card reader 13, a money receiving device 14, and an external storage device 15 are connected to the control unit 10. The input device 11 receives an operation of a player and outputs a signal according to contents of the operation to the control unit 10. The output device 12 includes a monitor displaying a game screen and the like, a speaker outputting a sound, and the like. The card reader 13 reads information of a card 30 possessed by the player, and outputs a signal corresponding to the information to the control unit 10. The card 30 includes a nonvolatile storage medium (not illustrated) such as an IC chip and a magnetic stripe. An ID unique to each card 30 (hereinafter, also referred to as a card ID) and the like are recorded in the medium. Incidentally, the card ID may be recorded on the card 30 in the embodiment of barcodes or the like. The money receiving device 14 detects an amount of money (coins or bills) inserted by the player, and outputs a signal based on the inserted amount to the control unit 10. The external storage device 15 is a storage device capable of storing and holding, such as, for example, a hard disk storage device or the like. The external storage device 15 stores a game program 101 to be executed in the control unit 10, and a variety of data such as game data 102 referred to by the program 101.

The control unit 10 reads and executes the game program 101 of the external storage device 15. Therefore, in the inside of the control unit 10, a game control unit 16, a matching processing unit 17, and a charging management unit 18 are provided as logical devices. The game control unit 16 executes a variety of processes necessary for playing the game, such as the management of the start, progress, and end of the game provided to the player by the game machine 2. In collaboration with the center server 3, the matching processing unit 17 processes a matching between players, which is necessary when executing a game using communication between different game machines 2 within the same store 6 or between game machines 2 of different stores 6. The charging management unit 18 executes processes related to a payment of a play fee, such as a process of requesting the player to pay a play fee, and a process of determining whether or not the requested amount of the play fee is paid. Incidentally, in this embodiment, as the play fee payment device (payment method), a method of paying in cash using the money receiving device 14 and a method of paying with electronic money from an account managed in the center server 3 can be selected. Details of the play fee payment will be described below.

The center server 3 includes a control unit 20 and an external storage device 21. The control unit 20 is a computer unit that includes a microprocessor and an internal storage device (not illustrated), such as a ROM storing a program of an operating system or the like necessary to be executed in the microprocessor, and a RAM providing a working area to the microprocessor. An input device such as a keyboard, and an output device such as a monitor are connected to the control unit 20, but illustrations thereof are not provided. The external storage device 21 stores a server program 201 to be executed in the control unit 20, and a variety of data referred to by the program 201. The external storage device 21 stores play data 202 and account data 203 as a type of data to be referred to by the control unit 20.

The play data 202 is a set of records recorded by associating the above-described player information with IDs unique to players (hereinafter, referred to as player IDs). The account data 203 is a set of records recorded by associating an amount of electronic money held by the players with the player IDs. The card IDs recorded in the card 30 and the player IDs are associated in one-to-one or many-to-one correspondence. The external storage device 21 of the center server 3 also records data necessary for determining a correspondence relation between the card IDs and the player IDs. An amount of electronic money held by the account data 203 can be increased (deposited) by the player through a website or the like operated by a system operator or the like. A charging to the player with respect to the deposit of electronic money, for example, is separately performed through a payment device, such as a credit card. Alternatively, electronic money may also be deposited by exchange with cashes by using a terminal dedicated to deposit of electronic money, or the like. The deposit and payment of the electronic money with respect to the account data 203 may be identical to those of a prepaid type electronic money system, and a detail description thereof will not be provided.

The control unit 20 reads and executes the server program 201 of the external storage device 21. Therefore, in the inside of the control unit 20, a matching processing unit 22 and an account management unit 23 are provided as logical devices. The matching processing unit 22 matches players of the plurality of game machines 2 according to the matching request from the game machines 2. The account management unit 23 manages processing related to the management of electronic money. For example, in response to a request from the game machine 2 to withdraw the play fee, the account management unit 23 withdraws a designated amount of electronic money from the record corresponding to the account data 203. In addition to the illustrated logical devices, if necessary, a variety of logical devices may be provided in the control unit 10 of the game machine 2 and the control unit 20 of the center server 3.

Figure 3:
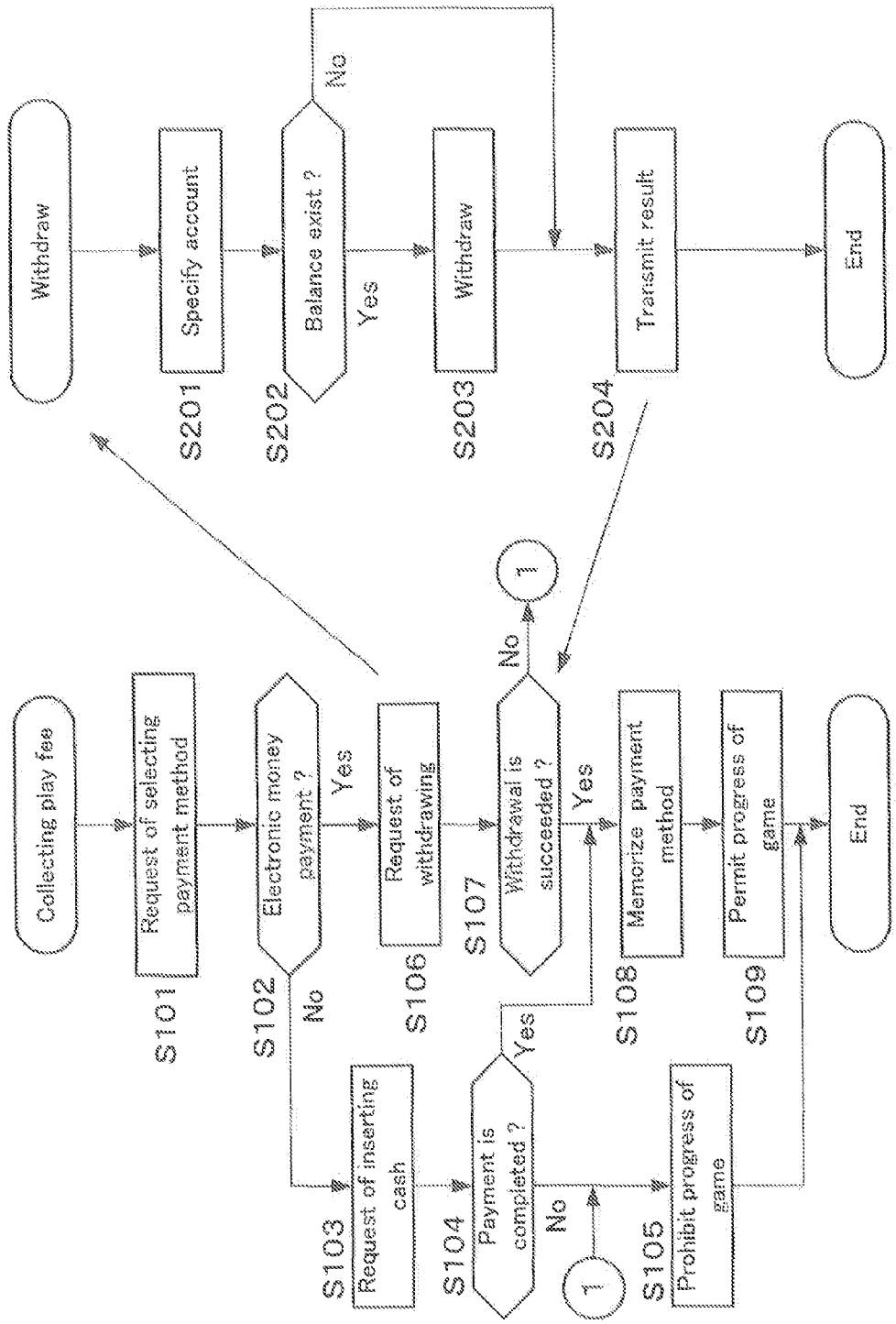
FIG. 3 is a flowchart illustrating a process of when a play fee is collected.

Next, processing executed by the control unit 10 or the like of the game machine 2 when the player plays a game in the game machine 2 will be described. FIG. 3 illustrates processing of each of the game machine 2 and the center server 3 when a play fee of the game is collected from a player. Incidentally, the processing of FIG. 3 is executed before the start of the game and also after the player makes the card 30 read by the card reader 13 of the game machine 2 and thus the control unit 10 identifies the card ID of the card 30. When collecting the play fee, the control unit 10 of the game machine 2 executes a play fee charging routine of FIG. 3 by using the charging management unit 18. In first step S101 of the play fee charging routine, the control unit 10 requests the player to select the play fee payment method (payment method). In this case, the player can select one of a method of paying the play fee in cash through the money receiving device 14 (hereinafter, referred to as a cash payment) and a method of paying the play fee by electronic money deposited into the player's account (hereinafter, referred to as an electronic money payment).

In subsequent step S102, the control unit 10 determines whether the player selects the electronic money payment. When the electronic money payment is not selected, that is, when the cash payment is selected, the control unit 10 proceeds to step S103, and makes a request so as to insert a predetermined play fee into the money receiving device 14. In subsequent step S104, the control unit 10 determines whether the play fee payment is completed within a predetermined period, with reference to an output from the money receiving device 14. When completed, the control unit 10 proceeds to step S108 and, as a payment result, memorizes that the play fee is paid in cash. In subsequent step S109, the control unit 10 permits the progress of the game and ends the play fee charging routine of this time. On the other hand, when the payment is not completed, the control unit 10 proceeds to step S105, prohibits the progress of the game, and ends the play fee charging routine of this time.

When it is determined in step S102 that the electronic money payment is selected, the control unit 10 proceeds to step S106, and requests the center server 3 to withdraw the play fee from the account. In this case, in order to specify the account of the player and withdraw an accurate amount of the play fee, the request generated in step S106 contains the amount of the play fee to be withdrawn, and the card ID for specifying the account. Subsequently, the control unit 10 proceeds to step S107, waits for the transmission of the withdrawal result from the center server 3, and determines whether or not the withdrawal is succeeded.

Meanwhile, when receiving the withdrawal request from the game machine 2, the control unit 20 of the center server 3 starts the withdrawal routine of FIG. 3 by using the account management unit 23. In the withdrawal routine, in step S201, the control unit 20 specifies the record of the account of the player from the account data 203 by using the card ID sent from the game machine 2. In subsequent step S202, the control unit 20 determines whether a balance (amount of electronic money deposited) above the amount of the play fee exists in the account of the player. When the balance exists, the control unit 20 proceeds to step S203, and withdraws the play fee from the account of the player. That is, the account data 203 is updated so as to reduce the electronic money as much as the play fee from the account of the player. On the other hand, when the balance is lack in step S202, the control unit 20 skips step S203. In subsequent step S204, the control unit 20 transmits the withdrawal result to the game machine 2, that is, information determining whether or not the withdrawal is succeeded, and ends the withdrawal routine.

The control unit 10 of the game machine 2 receiving the withdrawal result determines whether or not the withdrawal is succeeded, based on the information. When succeeded, the control unit 10 proceeds to step S108 and, as a payment result, memorizes that the play fee is paid by electronic money. Subsequently, the control unit 10 permits the progress of the game in step S109. On the other hand, when the withdrawal is failed, that is, when the play fee may not be withdrawn due to the lack of the balance, the control unit 10 proceeds to step S105, and prohibits the progress of the game. After the processing of step S105 or S109, the play fee charging routine of this time is ended as described above. Incidentally, when the progress of the game is prohibited in step S105, the player may not start the game. On the other hand, when the progress of the game is permitted in step S109, the player can play the game provided by the game machine 2.

Figure 4:
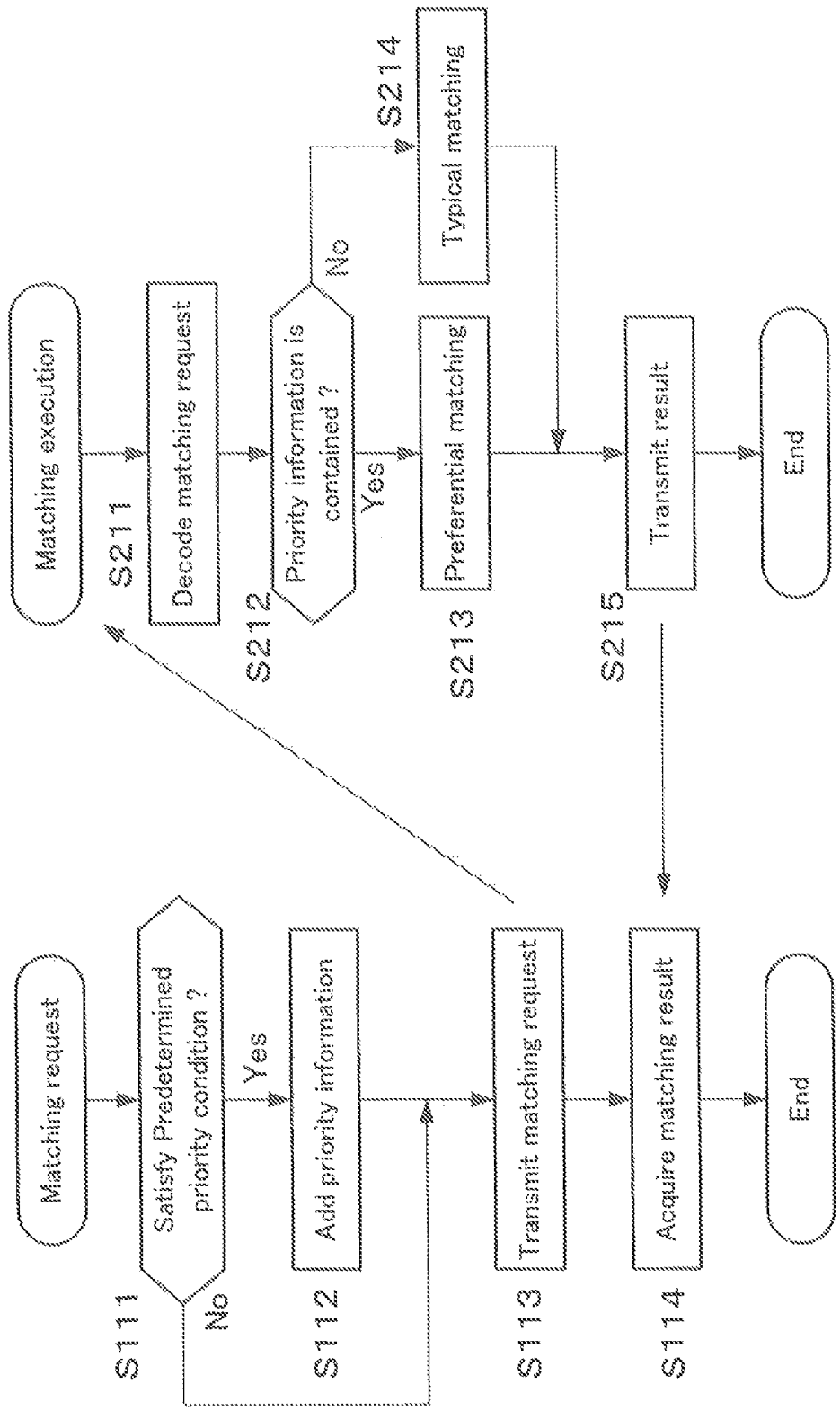
FIG. 4 is a flowchart for processing a matching.

FIG. 4 illustrates processing executed using the matching processing units 17 and 22 by the game machine 2 and the center server 3 in order for matching the players. When the payment of the play fee is completed and the progress of the game is permitted, the game machine 2 checks whether or not the player wants to participate in the game using the network. When the player wants to participate in the game, the control unit 10 of the game machine 2 starts the matching request routine of FIG. 4. Incidentally, prior to the start of the matching request routine of FIG. 4, the control unit 10 of the game machine 2 acquires player information corresponding to the player of the game machine 2 from the center server 3, and holds the acquired player information in the internal storage device. This processing, for example, is realized in such a way that the card ID of the card 30 is read by the card reader 13 and transmitted to the center server 3, and the control unit 20 of the center server 3 determines the player ID corresponding to the card ID and transmits the player information corresponding to the determined player ID to the game machine 2.

When the matching request routine of FIG. 4 is started, the control unit 10 of the game machine 2 first determines in step S111 whether or not the player satisfies a predetermined priority condition set with respect to a matching, based on information held by the game machine 2. The priority condition is a condition set for determining whether to prioritize the matching between specific players over other matching, that is, for determining whether to realize the preferential matching. The priority condition is set uniformly throughout the game system 1. Examples of the preferential matching include preferentially matching the players satisfying the priority condition, and matching the players satisfying the priority condition and the players satisfying a specific condition in preference to other players. The priority condition and the specific condition may be set such that the latter is contained in a part of the former, may be set such that both partially coincide with each other, or may be set such that both are completely different. A specific example will be described later. When the priority condition is satisfied, the control unit 10 of the game machine 2 proceeds to step S112, and adds predetermined priority information to the matching request to be sent to the center server 3. The priority information indicates that at least the player satisfies the priority condition. On the other hand, when the priority condition is not satisfied in step S111, the control unit 10 of the game machine 2 skips step S112.

In subsequent step S113, the control unit 10 of the game machine 2 transmits the matching request to the center server 3. In the matching request, as information minimally necessary for executing the matching by the matching processing unit 22 of the center server 3, there is contained the card ID or player ID serving as player identification information. Also, the IP address for specifying the game machine 2 is contained in the matching request. Furthermore, when the priority condition is satisfied, the priority information also is contained in the matching request. After the transmission of the matching request, the control unit 10 of the game machine 2 proceeds to step S114, and waits until the matching result is transmitted from the center server 3.

When the matching request is transmitted from the game machine 2, the control unit 20 of the center server 3 starts the matching execution routine of FIG. 4. In the matching execution routine, the control unit 20 first decodes the information contained in the matching request in step S211. In subsequent step S212, the control unit 20 determines whether or not the priority information is contained in the matching request. When the priority information is contained, the control unit 20 proceeds to step S213, and executes the preferential matching processing. On the other hand, when the priority information is not contained, the control unit 20 proceeds to step S214, and executes the typical matching processing.

The typical matching processing of step S214 extracts, from the play data 202, the player information corresponding to the player identification information sent from the game machine 2, and determines whether or not the matching of the players is possible, based on determined information as information to be considered in the matching (hereinafter, sometimes referred to as matching reference information) such as the level of the player held in the player information, and matches the players determined as possible in matching. This processing may be identical to the matching processing in the conventional game system. On the other hand, the preferential matching processing of step S213 is processing in which the above-described preferential matching is tried preferentially and, when the preferential matching fails, the players are matched by the typical matching processing. In this embodiment, the control unit 10 of the game machine 2 determines whether or not the priority condition is satisfied. When the priority condition is satisfied, the priority information is added to the matching request. Therefore, the center server 3 need not extract the information for determining whether or not the priority condition is satisfied, based on the player identification information. For this reason, the increase in the load of the center server 3 necessary for realizing the preferential matching is suppressed.

When the matching processing is executed in step S213 or S214, the control unit 20 proceeds to step S215, and transmits the matching result to the game machine 2. The control unit 10 of the game machine 2, to which the matching result is transmitted, acquires the matching result in step S114. By the above, the control units 10 and 20 end the processing of FIG. 4. The matching result contains the identification information of the matched players and the IP addresses specifying the game machines 2 of those players. The game machine 2 determines the IP address of the game machine 2 to be a communication opponent, based on the matching result. Subsequently, the communication environment is set such that a certain game machine 2 among the game machines 2 of the matched players becomes a parent machine, and another game machine 2 becomes a child machine. Subsequently, the play of the game using the communication between the game machines 2 is started.

Next, a specific example of the preferential matching will be described. Incidentally, in the following example, it is assumed that a Mahjong game is executed by the game machine 2, a part of players includes persons recognized as professional Mahjong players (hereinafter, referred to as pro Mahjong player) in the actual Mahjong, and whether or not the player is a pro Mahjong player can be determined by the player information sent from the center server 3 to the game machine 2. Furthermore, in the Mahjong game executed in the game machine 2, it is assumed that a game mode in which only persons paying the play fee by electronic money can participate (hereinafter, referred to as a predetermined game mode) is prepared.

Figure 5:
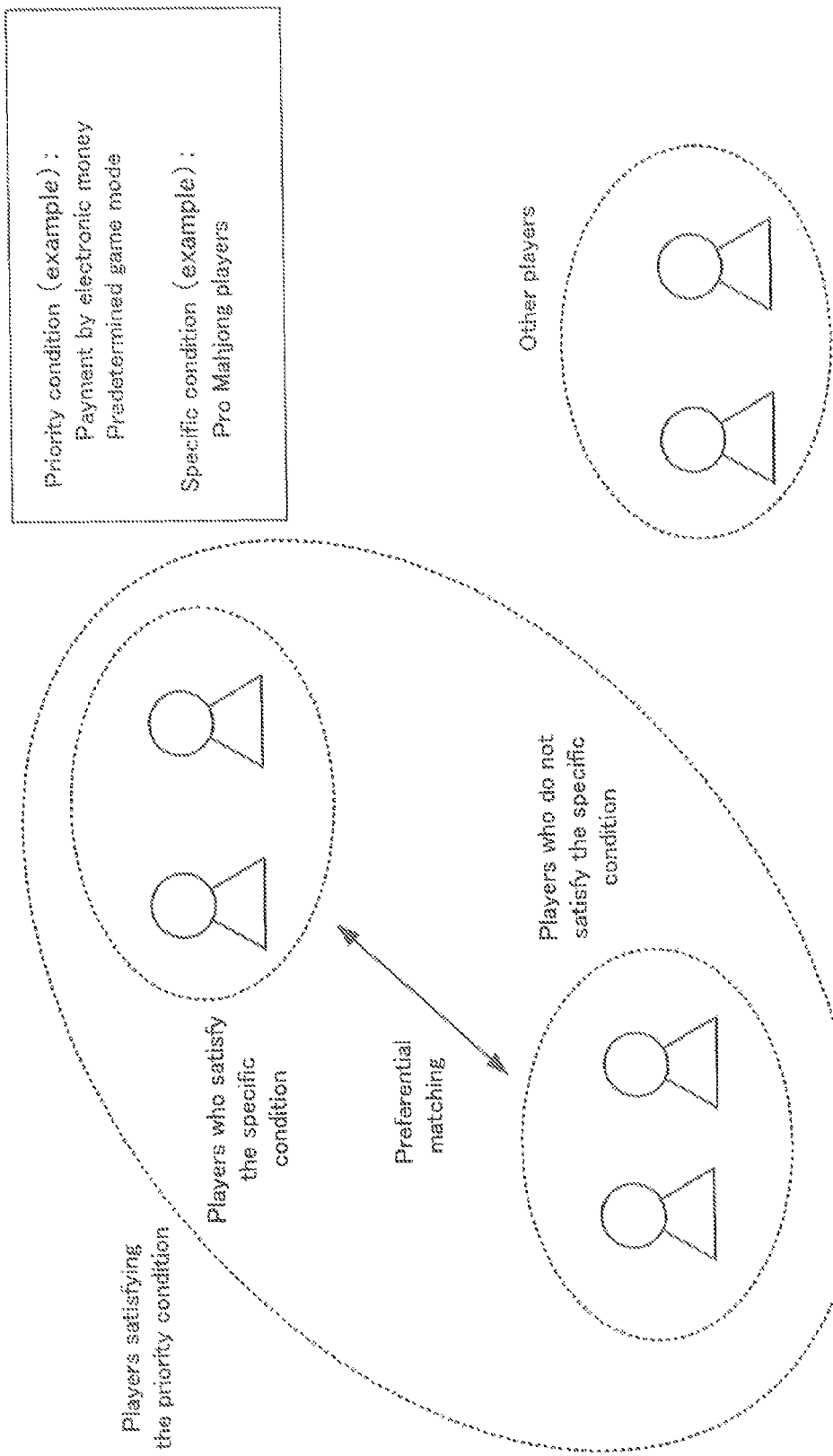
FIG. 5 is a diagram illustrating a specific example of a preferential matching.

FIG. 5 is a conceptual diagram illustrating an example of a preferential matching. In this example, the payment of the play fee by the electronic money and the participation in the predetermined game mode are set as the priority condition. Furthermore, it is assumed that the pro Mahjong players among the players satisfying the priority condition also satisfy the specific condition. Within the range of the players satisfying the priority condition, the players who do not satisfy the specific condition are preferentially matched with the players who satisfy the specific condition. That is, when players other than the pro Mahjong players pay the play fee by the electronic money and participate in the predetermined game mode, the probability of matching with pro Mahjong players is increased.

Figure 6:
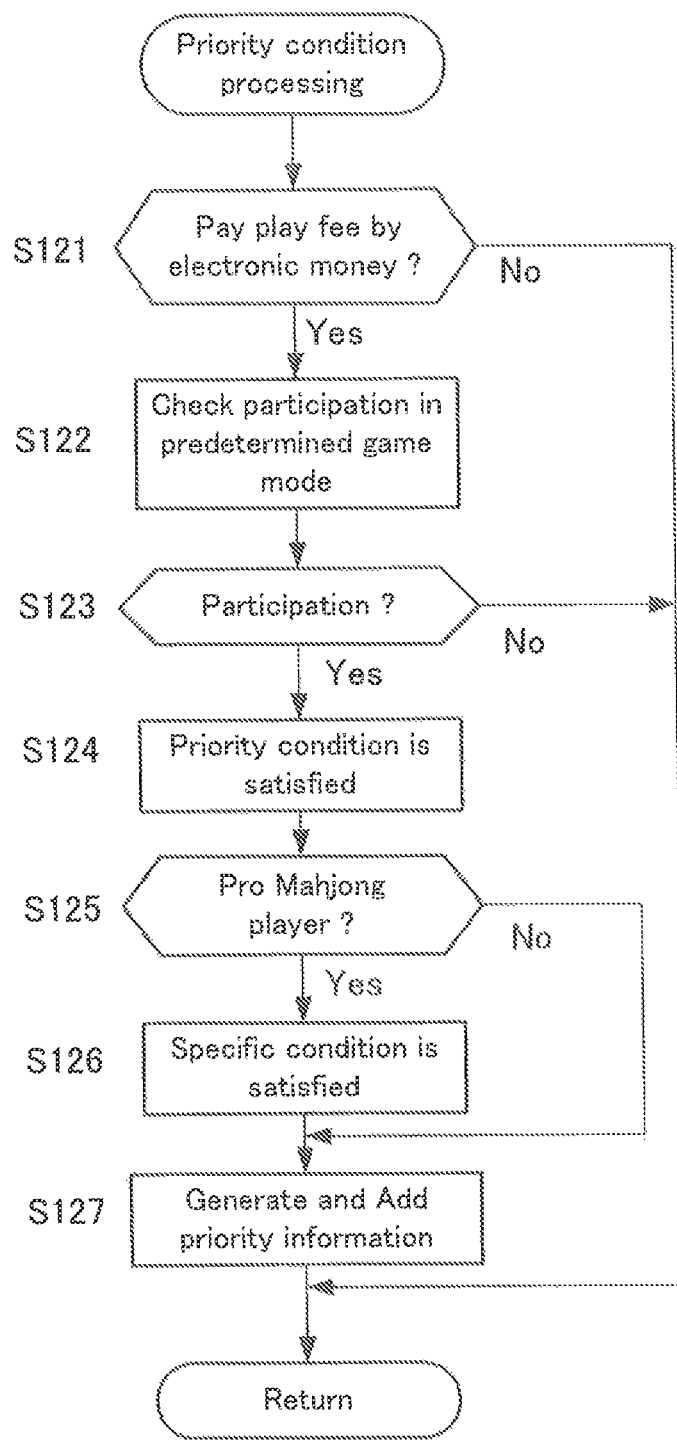
FIG. 6 is a flowchart illustrating a process executed by a control unit of a terminal device for realizing the preferential matching of FIG. 5.

FIG. 6 illustrates a priority condition processing routine executed by the control unit 10 of the game machine 2 in order to realize the matching of FIG. 5. Incidentally, this routine corresponds to the specific example of the processing of steps S111 and S112 in FIG. 4. In the priority condition processing routine of FIG. 6, the control unit 10 first determines in step S121 whether the player pays the play fee by the electronic money. That processing is determined by information stored in step S108 of FIG. 3. The control unit 10 ends the routine when the play fee is not paid by the electronic money, and proceeds to step S122 when the play fee is paid by the electronic money. In step S122, the control unit 10 checks whether or not the player requests the participation in the above-described predetermined game mode. In this case, the participation intention may be checked to the players through a monitor or the like. By allowing the select of the game mode in other process, the selection result may be checked in step S122.

In subsequent step S123, the control unit 10 determines whether the participation in the predetermined game mode is selected. The control unit 10 ends the routine when the participation is not selected, and proceeds to step S124 when the participation is selected. In step S124, the control unit 10 determines that the priority condition is satisfied. In subsequent step S125, the control unit 10 determines whether or not the player is a pro Mahjong player, with reference to the player information. When the player is the pro Mahjong player, the control unit 10 proceeds to step S126, and determines that the specific condition is further satisfied. Subsequently, the control unit 10 proceeds to step S127, generates the priority information, and adds the generated priority information to the matching request. In this case, the priority information contains information indicating that the priority condition is satisfied. When the specific condition is further satisfied, the priority information also contains information indicating that the specific condition is satisfied.

Figure 7:
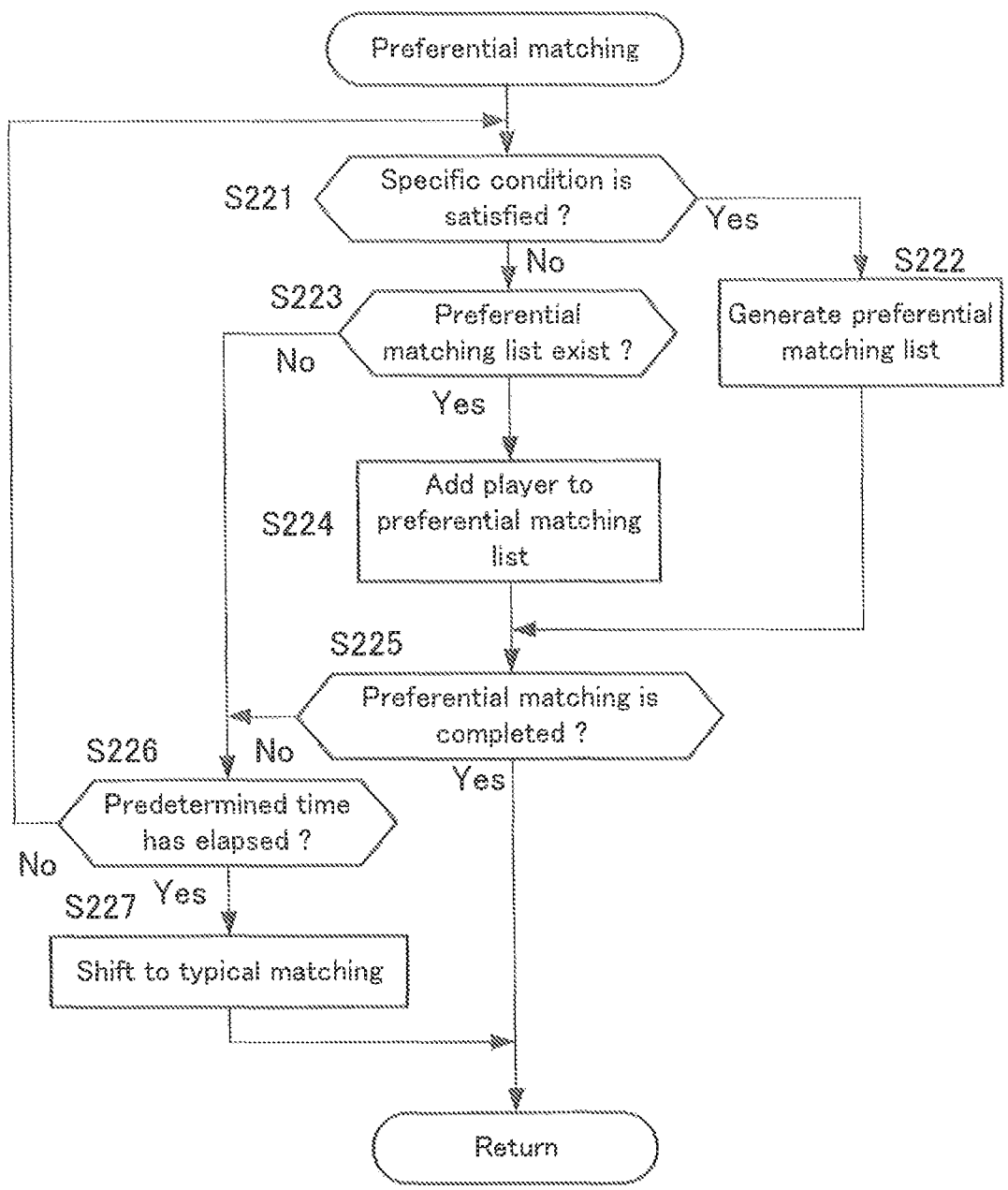
FIG. 7 is a flowchart illustrating a process executed by the control unit of the server device in correspondence to the process of FIG. 6.

FIG. 7 illustrates the preferential matching routine executed by the control unit 20 of the center server 3 in correspondence to the priority condition processing of FIG. 6. Incidentally, this routine corresponds to the specific example of the processing of steps S212 and S213 in FIG. 4. In the preferential matching routine of FIG. 7, the control unit 20 first determines whether the specific condition is satisfied with reference to the priority information contained in the matching request. When the specific condition is satisfied, that is, when it is the matching request from the pro Mahjong player, the control unit 20 proceeds to step S222. In step S222, the control unit 20 generates a preferential matching list for realizing the preferential matching, and stores the players, who are determined in step S221 as satisfying the specific condition (that is, pro Mahjong players satisfying the priority condition), in the preferential matching list. Incidentally, the preferential matching list is generated as table data storing identification information of the player to be matched and information (IP address) designating the game machine 2, and is held in the internal storage device of the control unit 20.

On the other hand, when it is determined in step S221 that the specific condition is not satisfied, the control unit 20 proceeds to step S223, and determines whether or not the preferential matching list exists. When the preferential matching list exists, the control unit 20 proceeds to step S224, and adds the player (that is, the player who satisfies the priority condition but is not the pro Mahjong player) to the list. Incidentally, by additionally determining whether or not a matching condition other than the priority condition (for example, a level of a player) is satisfied, whether or not the addition to the preferential matching list is possible may be determined.

In subsequent step S225, the control unit 20 determines whether or not the preferential matching is completed. In this case, when as many players as required for executing the game (in the case of the Mahjong game, four persons or three persons) are stored in the same preferential matching list, it is determined that the preferential matching is completed. Incidentally, even when the preferential matching list is generated in step S222, the processing of step S225 is progressed. When it is determined in step S225 that the preferential matching is completed, the control unit 20 completes the routine of FIG. 7. Even in that case, the information indicating the content of the preferential matching list is transmitted to the game machine 2 of the preferentially matched player as the matching result (step S215 of FIG. 4).

On the other hand, when it is determined in step S225 that the preferential matching is not completed, the control unit 20 proceeds to step S226, and determines whether or not a predetermined time has elapsed after the receipt of the matching request. The predetermined time, for example, is set as a period during which the preferential matching is to be tried. Incidentally, even when it is determined in step S223 that the preferential matching list does not exist, the processing of step S226 is progressed. This case means that the pro Mahjong player to be preferentially matched does not exist. When the predetermined time has not elapsed in step S226, the processing returns to step S221. On the other hand, when it is determined in step S226 that the predetermined time has elapsed, the control unit 20 proceeds to step S227, gives up the preferential matching, shifts to the typical matching, and ends the routine of FIG. 7.

According to the above processing, the preferential matching list is generated by triggering the transmission of the matching request from the game machine 2 of the pro Mahjong player satisfying the priority condition, and then, the player is added to the preferential matching list when the matching request is transmitted from the game machine 2 of the player who satisfies the priority condition and also is not the pro Mahjong player. In this way, the preferential matching illustrated in FIG. 5 is preferentially tried, and the probability of satisfying this is increased.

In the above embodiment, the control unit 10 of the game machine 2 functions as a priority determining device by executing the processing of step S111 of FIG. 4 or steps S121 to S124 of FIG. 6. The control unit 10 functions as a priority information adding device by executing the processing of step S112 of FIG. 4 or step S127 of FIG. 6. The control unit 20 of the center server 3 functions as a preferential matching device by executing the processing of steps S212 and S213 of FIG. 4 or steps S221 to S226 of FIG. 7. Also, the control unit 10 of the game machine 2 functions as a specific condition determining device by executing the processing of step S125 of FIG. 6, and the control unit 10 functions as a specific information adding device by executing the processing of step S127 of FIG. 6.

The present invention is not limited to the above-described embodiments, but can be modified in various forms. For example, the priority condition is not limited to the above example, and the priority condition may be set considering various elements as long as they can be determined based on information held in the terminal device. For example, when the play fee is paid by the electronic money, it may be determined that the priority condition is satisfied. And, the players satisfying the priority condition may be preferentially matched with one another. Alternatively, when the right for taking priority in the matching is purchased by the electronic money, it may be determined that the priority condition has been satisfied. The specific condition is not limited to the example set so as to limit a part of the players satisfying the priority condition. The priority condition and the specific condition may be set such that both are overlapped at only a part thereof. Also, the priority condition and the specific condition may be set such that both are completely different. For example, in this embodiment, the priority condition and the specific condition coincide with each other in terms of two points: the play fee payment by the electronic money and the selection of the predetermined game mode. Furthermore, since being the pro Mahjong player is weighted as the specific condition, it is considered that only a part of the players satisfying the priority condition satisfies the specific condition. However, the selection of the predetermined game mode is excluded from the priority condition and the specific condition, and it may be determined that the priority condition is satisfied when the play fee is paid by the electronic money. On the other hand, if the player is the pro Mahjong player, it may be determined that the specific condition is satisfied, regardless of the play fee payment method. A determination as to whether the specific condition is satisfied may be performed in the server device side. The present invention is not limited to the example in which the payment of at least a part of the play fee by the electronic money is set as the requirement satisfying the priority condition, and the priority condition may be set by factors different from the payment method. At least a part of consideration elements as to whether the priority condition is satisfied may be associated with information input to the terminal device through the input device by the player. In addition, the priority condition may be set in association with a variety of information that can be discriminated based on information held by the terminal device. The information held by the terminal device is acquired from the player by the terminal device, and appropriate information other than the above embodiments may be referred to as long as the information is acquired from the server device and further the information is generated by the terminal device based on the acquired information. For example, the terminal device may acquire or generate information, such as information as to whether or not the player selects the continue of the game, information as to whether or not the player has a specific attribute (for example, age, resident area, and the like), and information as to whether or not the number of plays of the game exceeds a predetermined value based on player information acquired from the server device, and the priority condition may be set based on the information.

The preferential matching may be separately tried in a plurality of steps. For example, a plurality of requirements may be set to players to be preferentially matched. And, first, the matching with players satisfying all requirements may be tried. Also, when the matching is not satisfied even after a predetermined time has elapsed, a part of requirements may be removed so that the range of players who can be matched is expanded. Subsequently, by appropriately reducing the matching requirements in the same manner, the matching may be tried while gradually expanding the range of the players who can be matched. In this case, the requirements of the players to be matched may also be set based on the information held by the terminal device. Also, the priority order among the requirements, that is, the order of the requirements to be removed, may be determined by the terminal device and be provided to the server device.

What is claimed is:

1. A game system in which a server device and a plurality of terminal devices are connected to one another through a network, a matching request containing player identification information for identifying players is transmitted from each of the plurality of terminal devices to the server device, the server device receiving the matching request matches the players with reference to the player identification information, and a game is executed using communication between the terminal devices of the matched players, and wherein each of the plurality of terminal devices comprises:
a priority determining device that determines whether or not a player satisfies predetermined priority condition set in association with information held by the terminal device, in order to determine whether to prioritize a matching between specific players over other matching; and
a priority information adding device that adds priority information, which indicates that the corresponding priority condition is satisfied, to the matching request, when it is determined in the priority determining device that the priority condition is satisfied, and the server device comprises a preferential matching device that, when receiving the matching request to which the priority information is added, matches players of the terminal devices transmitting the matching request among the specific players in preference to players who do not satisfy the priority condition.

2. The game system according to claim 1, wherein the preferential matching device preferentially matches the player satisfying the priority condition with the player satisfying a predetermined specific condition.

3. The game system according to claim 2, wherein the terminal device comprises:
a specific condition determining device that determines whether or not the player satisfies the specific condition, based on the information held by the corresponding terminal device; and
a specific information adding device that adds specific determination information for determining whether or not the specific condition is satisfied, to the matching request, and wherein
when receiving the matching request to which the specific information is added, the preferential matching device preferentially matches the player of the terminal device transmitting the corresponding matching request with the player of the terminal device transmitting the matching request to which the priority information is added.

4. The game system according to claim 2, wherein the specific condition is set such that the specific condition is satisfied by limiting a part of players satisfying the priority condition, and
the preferential matching device preferentially matches a player, who satisfies the specific condition, with a player, who satisfies the priority condition but does not satisfy the specific condition.

5. The game system according to claim 1, wherein the terminal device can select one payment method from a plurality of payment methods with respect to at least a part of a game play fee;
payment information determining whether a specific payment method is selected from the plurality of payment methods is held in the terminal device;
the priority determining device determines whether or not the specific payment method is selected based on the payment information, and determines that at least a part of the priority condition is satisfied, when the specific payment method is selected.

6. The game system according to claim 1, wherein the terminal device can allow the player to select a game play in a predetermined game mode;
mode selection information determining whether the predetermined game mode is selected is held in the terminal device;
the priority determining device determines whether or not the predetermined game mode is selected, based on the mode selection information, and determines that at least a part of the priority condition is satisfied, when the predetermined game mode is selected.

7. A player matching method that is applied to a game system in which a server device and a plurality of terminal devices are connected to one another through a network, a matching request containing player identification information for identifying players is transmitted from each of the plurality of terminal devices to the server device, the server device receiving the matching request matches the players with reference to the player identification information, and the matching result is transmitted from the server device to the terminal devices, and wherein the player matching method comprises the steps:
a priority determining step that determines, by the terminal devices, whether or not a player satisfies predetermined priority condition set in association with information held by the terminal device, in order to determine whether to prioritize a matching between specific players over other matching;
a step that adds, by the terminal devices, priority information, which indicates that the corresponding priority condition is satisfied, to the matching request, when it is determined in the priority determining step that the priority condition is satisfied; and
a step that, when the server device receives the matching request to which the priority information is added, matches players of the terminal devices transmitting the matching request among the specific players in preference to players who do not satisfy the priority condition.

* * * * *